United States Patent
Blount

(10) Patent No.: US 6,545,597 B1
(45) Date of Patent: Apr. 8, 2003

(54) REAR WINDOW SEATBELT INDICATOR LIGHTS

(76) Inventor: Grace Marie Blount, 19 Camelot Ct., Roseville, CA (US) 95678

( * ) Notice: Subject to any disclaimer, the term of this patent is extended or adjusted under 35 U.S.C. 154(b) by 0 days.

(21) Appl. No.: 09/940,144

(22) Filed: Jan. 9, 2002

(51) Int. Cl.[7] .................................................. B60Q 1/00
(52) U.S. Cl. ................ 340/425.5; 340/457; 340/457.1; 340/461; 340/458; 340/459; 340/468
(58) Field of Search ........................... 340/425.5, 457.1, 340/461, 458, 459, 469, 468

(56) References Cited

U.S. PATENT DOCUMENTS

| | | | | |
|---|---|---|---|---|
| 3,906,441 A | * | 9/1975 | Andersen et al. | 340/457.1 |
| 4,107,645 A | * | 8/1978 | Lewis et al. | |
| 4,849,733 A | * | 7/1989 | Conigliaro et al. | 340/457.31 |
| 5,711,574 A | * | 1/1998 | Barnes | 340/457.1 |
| 5,714,930 A | * | 2/1998 | McKinney, Jr. | 340/457.1 |
| 6,215,395 B1 | * | 4/2001 | Slauughter et al. | 340/457.1 |

* cited by examiner

Primary Examiner—Daryl Pope

(57) ABSTRACT

A device for providing and indication of seatbelt use to observers following a vehicle such that when a seat that is occupied by a person, does not have a connected seatbelt, an indicator in the rear window of the vehicle which has multiple lights corresponding to each seat belt in the vehicle, illuminates each light corresponding to that seat belt that has not been connected.

1 Claim, 1 Drawing Sheet

ALL INDICATOR LIGHTS ARE SEPERATED BY 1/8" SPACE

AND IS DESIGNED TO BE ½" LONG BY 1-7/8" WIDE

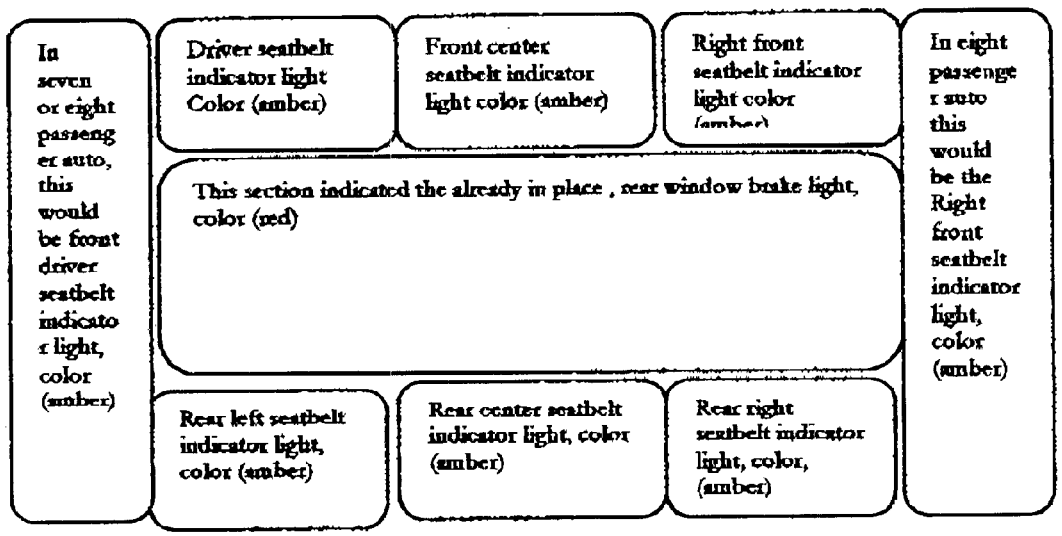
ALL INDICATOR LIGHTS ARE SEPERATED BY 1/8" SPACE
AND IS DESIGNED TO BE ½" LONG BY 1-7/8" WIDE

REAR WINDOW SEATBELT INDICATOR LIGHTS

I, Grace Marie Blount am amending the detail and brief description of my design for the above, "Rear Window Seabelt Indicator lights". The purpose of the amendment is to be more specific with the design for accuracy.

The second reason for the change is that some vehicles do have more than six passenger seats, which would require more lights to indicate if passengers are fastened into a seatbelt.

This design should cover at least an eight-passenger vehicle.

Thereby, should there be an eight passenger vehicle, three lights would be placed above the brake light, three lights would be placed below and the additional lights would be placed on either side of the brake light, making a total of eight rear window seatbelt indicator lights.

The two sidelights would then indicate the first two passengers, being the driver and front right passenger.

SPECIFICATIONS

PART 1

BRIEF DESCRIPTION OF:

REAR WINDOW SEATBELT INDICATOR LIGHTS

Seatbelt indicator lights are GREEN in color. They are in off position (showing no color) when no one is seated and auto ignition is on, once a person is seated, light will blink on and off until seatbelt is fastened around the passenger properly.

Seatbelt indicator lights blinks is passenger is seated but not fastened properly when auto in motion.

Each seatbelt indicator light is in steady green position when a passenger is seated and fastened properly.

Each Vehicle seatbelt indicator lights are 0.5" long ×1⅞" wide and spaced ¼" between each light. Each Vehicle Rear Window Seatbelt Indicator Light is green.

There are three vehicle indicator lights above, below the already designed, and in place brake light, located in the rear window of most vehicle. A total of sic seatbelt indicator lights. **If the automobile were a seven or more passenger vehicle, the total number of lights would be designed to fit that vehicle.

The number of lights should indicate the number of passenger seats designed in the vehicle. This mechanism is designed for vehicles with two or more passenger seats.

Vehicle seatbelt indicator lights are designed to frame the already in place brake light and are made from the same plastic mechanics as brake light, with the exception of color which is green.

Connectors for these lights are wired from lighted location in rear windows of all vehicles, to seatbelts and work in conjunction to the already in place dashboard seatbelt indicators.

What is claimed is:

1. An indicator for indicating seatbelt usage in a vehicle having a rear window and at least two or more seat belts, wherein the indicator is positioned in the rear window so as to be visible to anyone viewing the vehicle from the rear, the indicator consisting of:

a rear brake indicator a separate indicator light corresponding to each seat belt in the vehicle, said indicator lights having a length of 0.5 inches, a width of 1⅞ inches, and being spaced ¼ inches between each said light;

connectors which connect each seat belt to said corresponding indicator light so as to provide a signal as to a connection status of the seat belt; and a frame which connects the lights to the rear brake indicator, and positions the lights above and below said rear brake indicator, wherein said indicator lights are operated such that when the vehicle is off, said indicator lights are inoperative, and when the vehicle is on and in motion, said indicator light corresponding to each seatbelt that is occupied by a person will blink on and off until that seat belt is fastened.

* * * * *